(12) United States Patent
Friesen et al.

(10) Patent No.: US 8,632,921 B2
(45) Date of Patent: Jan. 21, 2014

(54) ELECTROCHEMICAL CELL WITH DIFFUSER

(75) Inventors: Cody A. Friesen, Fort McDowell, AZ (US); Grant Friesen, Fountain Hills, AZ (US); Ramkumar Krishnan, Gilbert, AZ (US); Todd Trimble, Phoenix, AZ (US)

(73) Assignee: Fluidic, Inc., Scottsdale, AZ (US)

( * ) Notice: Subject to any disclaimer, the term of this patent is extended or adjusted under 35 U.S.C. 154(b) by 451 days.

(21) Appl. No.: 13/019,923

(22) Filed: Feb. 2, 2011

(65) Prior Publication Data

US 2011/0189551 A1 Aug. 4, 2011

Related U.S. Application Data

(60) Provisional application No. 61/301,377, filed on Feb. 4, 2010.

(51) Int. Cl.
- *H01M 8/22* (2006.01)
- *H01M 8/06* (2006.01)
- *H01M 8/08* (2006.01)
- *H01M 8/04* (2006.01)

(52) U.S. Cl.
USPC ........... 429/405; 429/408; 429/403; 429/498; 429/513; 429/512

(58) Field of Classification Search
USPC .................. 429/405, 408, 403, 498, 513, 512
See application file for complete search history.

(56) References Cited

U.S. PATENT DOCUMENTS

| | | | |
|---|---|---|---|
| 3,717,505 A | 2/1973 | Unkle et al. | |
| 5,006,424 A | 4/1991 | Evans et al. | |
| 5,354,625 A | 10/1994 | Bentz et al. | |
| 6,787,260 B2 | 9/2004 | Smedley | |
| 6,911,274 B1 | 6/2005 | Colborn et al. | |
| 6,942,105 B2 | 9/2005 | Smedley et al. | |
| 7,276,309 B2 | 10/2007 | Smedley et al. | |
| 2009/0284229 A1 | 11/2009 | Friesen et al. | |
| 2010/0285375 A1 | 11/2010 | Friesen et al. | |

(Continued)

FOREIGN PATENT DOCUMENTS

| WO | 96/00986 A1 | 1/1996 |
|---|---|---|
| WO | 00/44057 A1 | 7/2000 |

OTHER PUBLICATIONS

Intl. Preliminary Report on Patentability dated Aug. 16, 2012 of PCT/US2011/023620 filed Feb. 3, 2011 (9 pages).

(Continued)

*Primary Examiner* — Helen O Conley
(74) *Attorney, Agent, or Firm* — Pillsbury Winthrop Shaw Pittman, LLP

(57) ABSTRACT

An electrochemical cell includes a first electrode configured to operate as an anode to oxidize a fuel when connected to a load. The first electrode includes a permeable electrode body configured to allow flow of an ionically conductive medium therethrough. An electrode holder includes a cavity for holding the first electrode. A diffuser is positioned in the cavity between the first electrode and the electrode holder with a gap formed between the diffuser and the electrode holder. The diffuser includes openings configured to allow flow of the ionically conductive medium therethrough and to distribute the flow through the first electrode. A second electrode is positioned in the cavity on a side of the first electrode that is opposite the diffuser, and is configured to operate as a cathode when connected to the load and in contact with the ionically conductive medium.

22 Claims, 7 Drawing Sheets

(56) References Cited

U.S. PATENT DOCUMENTS

2010/0316935 A1    12/2010    Friesen et al.
2011/0070506 A1    3/2011    Friesen et al.
2011/0316485 A1    12/2011    Krishnan et al.
2012/0068667 A1    3/2012    Friesen et al.

OTHER PUBLICATIONS

International Search Rpt & Written Opinion dated Mar. 25, 2011 for corresponding PCT/US2011/023620 (12 pages).

ELECTROCHEMICAL CELL WITH DIFFUSER

CROSS-REFERENCE TO RELATED APPLICATIONS

This application claims the benefit of priority from U.S. Provisional Patent Application No. 61/301,377, filed Feb. 4, 2010, the content of which is incorporated herein be reference in its entirety.

FIELD

The present invention is generally related to an electrochemical cell, and more particularly to a metal-air cell that uses electrodeposited fuel.

BACKGROUND

Electrochemical cells using metal as the fuel are known. Examples of such devices are shown, for example, in U.S. Pat. Nos. 7,276,309; 6,942,105; 6,911,274 and 6,787,260, which are incorporated herein in their entirety. A short list of disadvantages of these previous embodiments includes: the buildup of precipitated reaction products in the anode space and the cathode space, issues related to the feed of the solid particle fuel, the sluggish rate of net oxidation of the fuel due to the increased concentration of oxidized fuel in the vicinity of the as yet unoxidized fuel.

Metal-air cells or batteries that do not use particulates are also known. A metal-air cell typically comprises an anode at which metal fuel is oxidized, an air breathing cathode at which oxygen from ambient air is reduced, and an electrolyte for supporting reactions of the oxidized/reduced ions.

The present application also endeavors to provide an effective and improved way of charging or re-charging the cell, which may be used with any type of cell where the fuel is electrodeposited.

SUMMARY

According to an aspect of the present invention, there is provided an electrochemical cell that includes a first electrode configured to operate as an anode to oxidize a fuel when connected to a load. The first electrode includes a permeable electrode body configured to allow flow of an ionically conductive medium therethrough. The cell also includes an electrode holder comprising a cavity for holding the first electrode, and a diffuser positioned in the cavity between the first electrode and the electrode holder with a gap formed between the diffuser and the electrode holder. The diffuser includes a plurality of openings configured to allow flow of the ionically conductive medium therethrough and to distribute the flow through the first electrode. The cell also includes a second electrode positioned in the cavity on a side of the first electrode that is opposite the diffuser. The second electrode is configured to operate as a cathode to reduce an oxidizer when connected to the load and in contact with the ionically conductive medium.

According to an aspect of the present invention, there is provided a method for generating electricity with an electrochemical cell. The electrochemical cell includes a first electrode configured to operate as an anode to oxidize a fuel when connected to a load and in contact with an ionically conductive medium. The first electrode includes a permeable electrode body. The cell also includes an electrode holder that includes a cavity for holding the first electrode, and a diffuser positioned in the cavity between the first electrode and the electrode holder with a gap formed between the diffuser and the electrode holder. A second electrode positioned in the cavity on a side of the first electrode that is opposite the diffuser, and is configured to operate as a cathode to reduce an oxidizer when connected to the load and in contact with the ionically conductive medium. The method includes flowing the ionically conductive medium to the gap between the diffuser and the electrode holder, distributing a flow of the ionically conductive medium with the diffuser across a cross-section of the electrochemical cell so that the ionically conductive medium flows through the first electrode substantially uniformly, oxidizing the fuel at the first electrode, and reducing the oxidizer at the second electrode.

According to an aspect of the present invention, there is provided a method for charging an electrochemical cell. The electrochemical cell includes a first electrode configured to operate as an anode to oxidize a fuel when connected to a load and in contact with an ionically conductive medium. The first electrode includes a permeable electrode body. The electrochemical cell also include an electrode holder that includes a cavity for holding the first electrode, a diffuser positioned in the cavity between the first electrode and the electrode holder with a gap between the diffuser and the electrode holder, and a second electrode positioned in the cavity on a side of the first electrode that is opposite the diffuser. The second electrode is configured to operate as a cathode to reduce an oxidizer when connected to the load and in contact with the ionically conductive medium. The method includes flowing the ionically conductive medium comprising reducible fuel ions to the gap between the diffuser and the electrode holder, distributing a flow of the ionically conductive medium with the diffuser across a cross-section of the electrochemical cell so that the ionically conductive medium flows through the first electrode substantially uniformly, applying an electrical current between the second electrode and the permeable electrode body with the second electrode functioning as an anode and the permeable electrode body functioning as a cathode, such that the reducible fuel ions are reduced and electrodeposited as fuel in oxidizable form on the permeable electrode body, and removing the electrical current to discontinue the charging.

According to an aspect of the present invention, there is provided a method for operating an electrochemical cell. The electrochemical cell includes a first electrode configured to operate as an anode to oxidize a fuel when connected to a load and in contact with an ionically conductive medium. The first electrode includes a permeable electrode body. The electrochemical cell also includes an electrode holder that includes a cavity for holding the first electrode, a diffuser positioned in the cavity between the first electrode and the electrode holder with a gap between the diffuser and the electrode holder, and a second electrode positioned in the cavity on a side of the first electrode that is opposite the diffuser. The second electrode is configured to operate as a cathode to reduce an oxidizer when connected to the load and in contact with the ionically conductive medium. The method includes generating electricity to power a load and charging the electrochemical cell. Generating electricity includes flowing the ionically conductive medium to the gap between the diffuser and the electrode holder, distributing a flow of the ionically conductive medium with the diffuser across a cross-section of the electrochemical cell so that the ionically conductive medium flows through the first electrode substantially uniformly, oxidizing the fuel at the first electrode, and reducing the oxidizer at the second electrode. Charging the electrochemical cell includes flowing the ionically conductive medium comprising reducible fuel ions to the gap between the diffuser and the electrode holder, distributing a flow of the ionically conductive medium with the diffuser across a cross-section of the electrochemical cell so that the ionically conductive medium flows through the first electrode substantially uniformly, applying an electrical current between the second electrode and the permeable electrode body with the second electrode functioning as an anode and the permeable electrode body functioning as a cathode, such that the reducible fuel ions are reduced and electrodeposited as fuel in oxidizable form on the permeable electrode body, and removing the electrical current to discontinue the charging.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
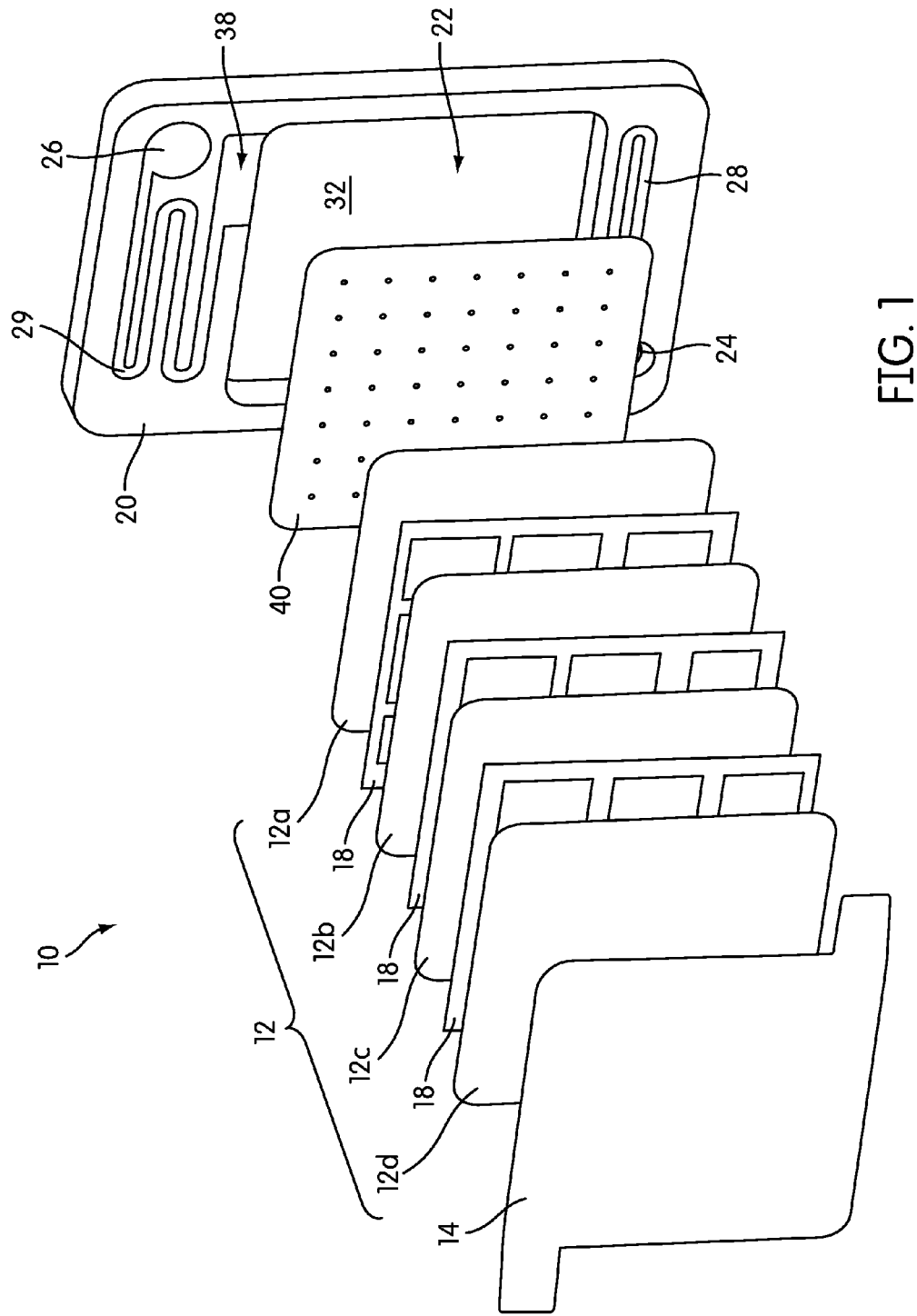
FIG. 1 is an exploded view of an electrochemical cell according to an embodiment of the present invention.

FIG. 1 illustrates an electrochemical cell 10 according to an embodiment of the invention. As illustrated, the cell 10 includes a first electrode 12, and a second electrode 14 that are supported by an electrode holder 20.

In an embodiment, the first electrode 12 is a metal fuel electrode that functions as an anode when the cell 10 operates in discharge, or electricity generating, mode, as depicted in the embodiment of FIG. 1, and discussed in further detail below. In an embodiment, the first electrode 12 may comprise a permeable electrode body 12a, such as a screen, that is made of any formation able to capture and retain, through filtering, electrodepositing, or otherwise, particles or ions of metal fuel from an ionically conductive medium that circulates in the cell 10, as discussed in further detail below. In an embodiment, the first electrode 12 may contain a plurality of permeable electrode bodies 12a-12d, as illustrated in FIG. 1, that may be separated by a plurality of spacers 18, each of which is positioned in between adjacent electrode bodies so that the electrode bodies 12a-12d may be electrically isolated from each other. The spacers 18 are also permeable so that the ionically conductive medium may flow through the spacers 18, but are non-conductive and electrochemically inert so they are inactive with regard to the electrochemical reactions.

In an embodiment, the permeable electrode bodies 12a-12d may have substantially the same size. In an embodiment, the permeable electrode bodies may have different sizes so that a stepped scaffold configuration may be used, as described by U.S. Provisional Patent Application Ser. No. 61/358,339, filed Jun. 24, 2010, the entire content of which is incorporated herein by reference.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. For example, the fuel may include oxidizable organic solids or immiscible liquid fuel micelles.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. The medium may also use a non-aqueous solvent or an ionic liquid. In the non-limiting embodiment described herein, the medium is aqueous potassium hydroxide. In an embodiment, the ionically conductive medium may comprise an electrolyte. For example, a conventional liquid or semi-solid electrolyte solution may be used, or a room temperature ionic liquid may be used, as mentioned in U.S. patent application Ser. No. 12/776, 962, filed May 10, 2010, the entire content of which is incorporated herein by reference. In an embodiment where the electrolyte is semi-solid, porous solid state electrolyte films (i.e. in a loose structure) may be utilized.

The fuel may be oxidized at the first electrode 12 when the first electrode 12 is operating as an anode, and an oxidizer, such as oxygen, may be reduced at the second electrode 14 when the second electrode 14 is operating as a cathode, which is when the cell 10 is connected to a load and the cell 10 is in discharge or electricity generation mode, as discussed in further detail below. The reactions that occur during discharge mode may generate by-products, e.g., precipitates including reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide, may be reversibly reduced and deposited as the fuel, e.g., zinc, onto the first electrode 12, which functions as a cathode during recharge mode. During recharge mode, either the second electrode 14, or a third electrode 16, described below, functions as the anode. The switching between discharge and recharge modes is discussed in further detail below.

To limit or suppress hydrogen evolution at the first electrode 12 during discharge mode and during quiescent (open circuit) periods of time, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution.

Figure 2:
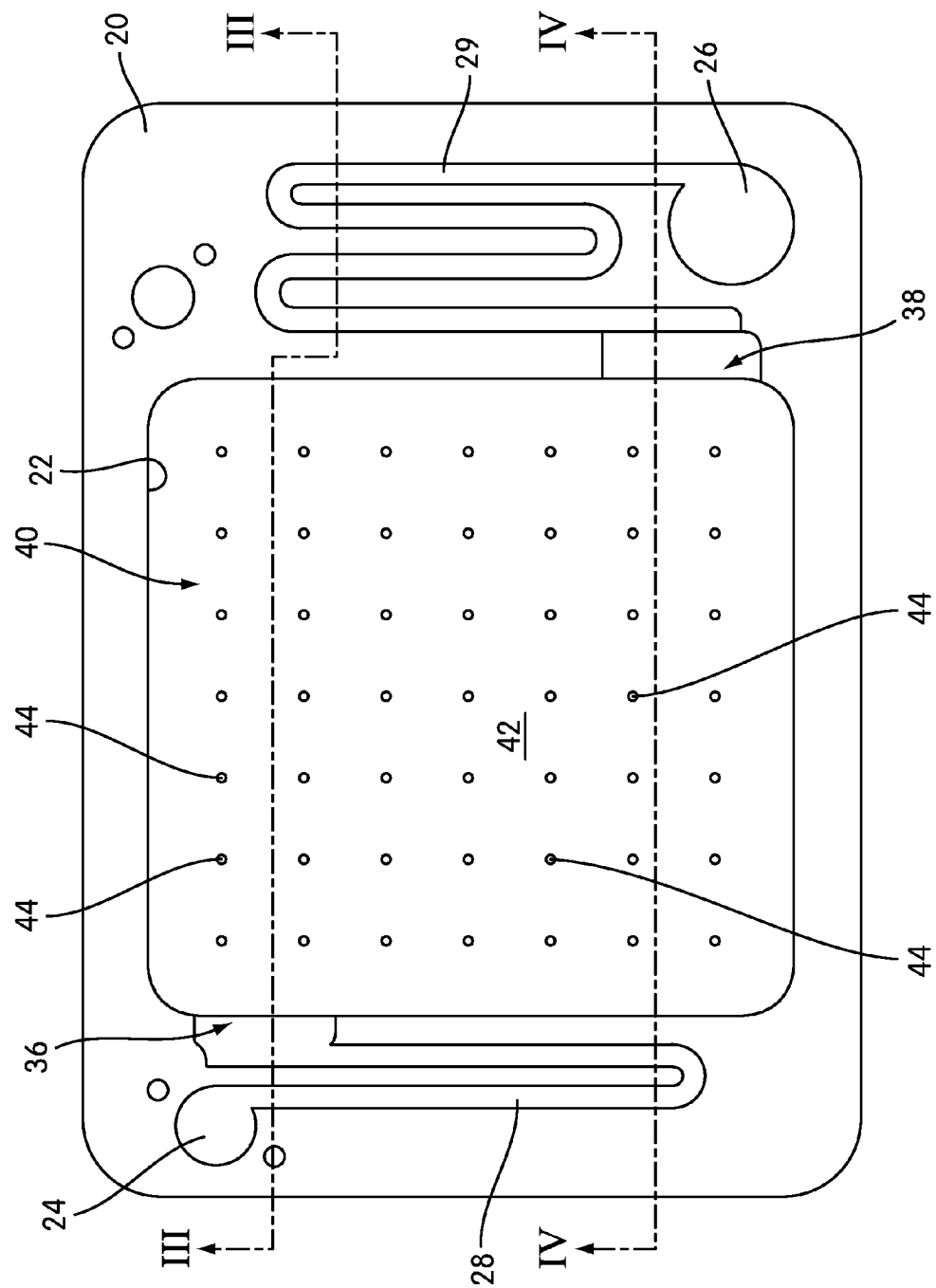
FIG. 2 is a top view of a portion of the electrochemical cell of FIG. 1.

As illustrated in FIG. 1, the electrode holder 20 has a cavity 22 that is configured to support the permeable electrode bodies 12a-12d. The electrode holder 20 also defines an inlet 24 and an outlet 26 for the cell 10. The inlet 24 is configured to allow the ionically conductive medium to enter the cell 10 and/or recirculate through the cell 10. The inlet 24 may be connected to the cavity 22 via an inlet channel 28, and the outlet 26 may be connected to the cavity 22 via an outlet channel 29. As illustrated in FIG. 2, the inlet channel 28 and the outlet channel 29 may each provide a meandering tortuous path through which the ionically conductive medium may flow. The meandering path defined by the inlet channel 28 does not include any sharp corners in which the flow of the medium may become stagnated or in which any particulates in the medium may collect. As discussed in further detail below, the length of the channels 28, 29 may be designed to provide an increased ionic resistance between cells that are fluidly connected in series.

Figure 3:
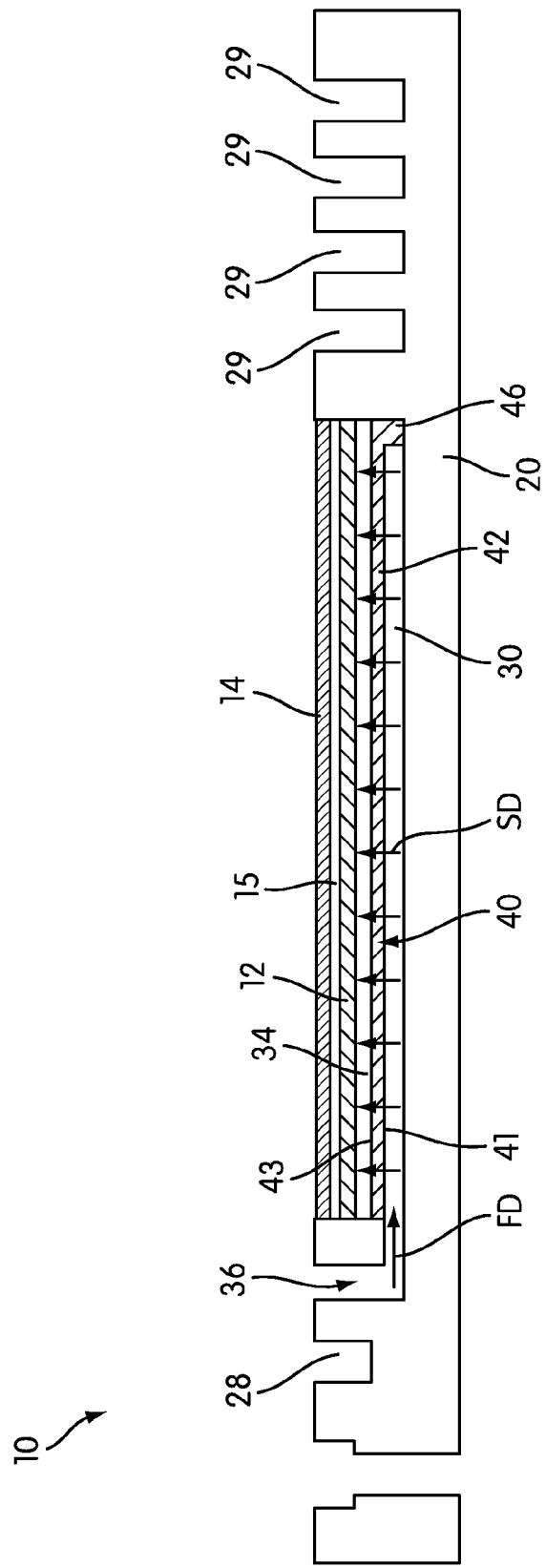
FIG. 3 is a cross-sectional view of an embodiment of the cell taken along line of FIG. 2 with additional portions of the cell in place.

Although the inlet channel 28 is configured to provide the medium to the cavity in a first flow direction FD that is substantially parallel to the first electrode 12, in order for the medium to flow through the first electrode 12, the flow direction of the medium should be redirected by about 90° so that the medium may flow in a second flow direction SD that is substantially perpendicular to the first electrode 12, as illustrated in FIG. 3. In order for the medium to be provided to the first electrode 12 in a substantially uniform manner across the cross-section of the cell 10, a diffuser 40 is positioned in the electrode holder 20 adjacent to the first electrode 12. The diffuser 40 is parallel to the first electrode 12 and configured to provide an essentially even distribution of flow of the medium through the first electrode 12, as discussed in further detail below.

Figure 4:
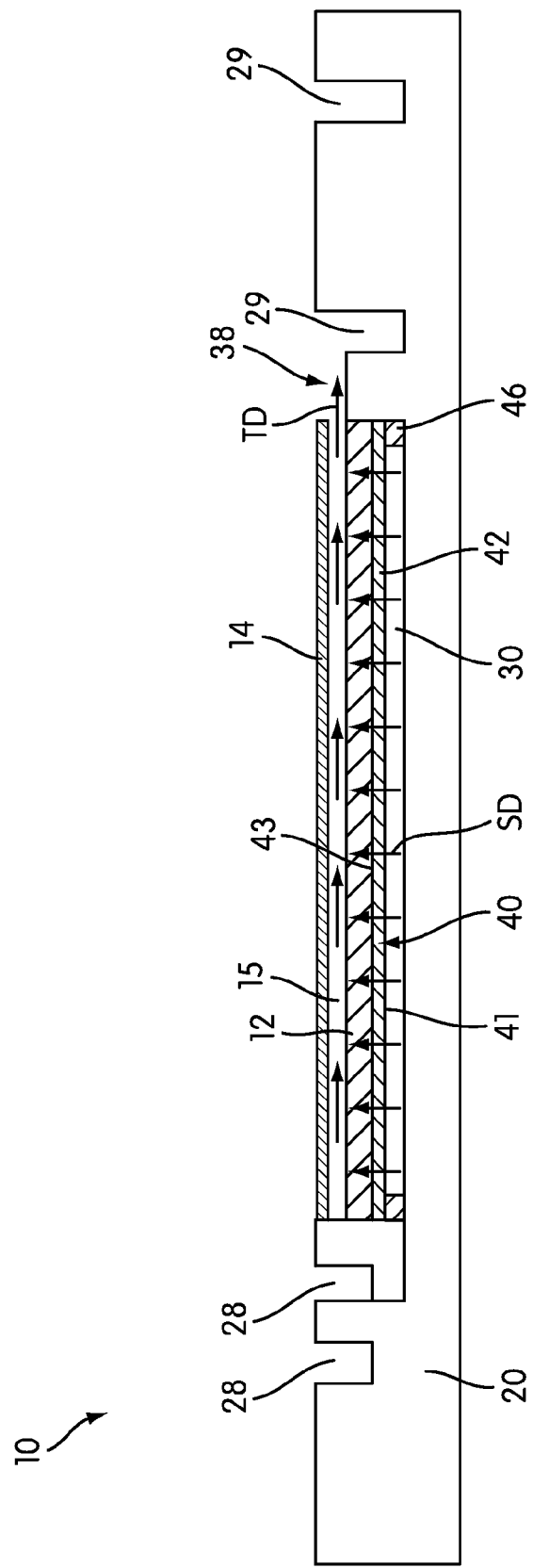
FIG. 4 is a cross-section view of an embodiment of the cell taken along line IV-IV of FIG. 2 with additional portions of the cell in place.

As illustrated in FIG. 2, the diffuser 40 includes a planar portion 42 that extends across the cavity 22 and occupies its entire area so that the medium must flow through the diffuser 40 rather than around it. As illustrated in FIG. 3, the diffuser 40 is positioned in the cavity 22 so that a first gap 30 is formed between a first side 41 of the planar portion 42 and a surface 32 of the electrode holder 20 that faces the first electrode 12. A second gap 34 may optionally be created between a second side 43 of the planar portion 42 and the first electrode 12. In an embodiment, the first electrode 12 may contact the planar portion 42 of the diffuser 40 so that no gap is created between the second side 43 of the planar portion 42 and the first electrode 12, as illustrated in FIG. 4.

The planar portion 42 includes a plurality of openings 44 that extend through the planar portion 42 from the first side 41 to the second side 43. The openings 44 are configured to allow the medium to flow therethrough and to the first electrode 12, as discussed in further detail below. The openings 44 may have the same size or may have different sizes, and may be located in a symmetric or non-symmetric pattern across the planar portion 42. In an embodiment, each opening may be circular and have a diameter of about 1 mm, and the openings may be spaced so that a distance between the centers of adjacent opening is about 21 mm. Although the openings 44 are illustrated to be in a symmetric, square pattern, the illustrated embodiment is not intended to be limiting in any way. For example, in an embodiment, the pattern of the opening may be hexagonal.

In an embodiment, a support 46 is provided between the first side 41 of the planar portion and the surface 32 of the electrode holder 20. The support 46 is configured to define the first gap 30. In an embodiment, the support 46 is part of the diffuser 40, in another embodiment, the support 46 is part of the electrode holder 20, and in a further embodiment, the support 46 is a separate piece that is placed in between the electrode holder 20 and the diffuser 40. The support 46 may be configured to support one, two, or three sides of the periphery of the planar portion 42 of the diffuser 40. If the support 46 is further configured to support the side of the periphery of the planar portion 42 that faces the inlet channel 28, an opening should be provided so that the medium may flow into the first gap 30 without obstruction.

The support 46 is configured to provide the first gap 30 with a height that allows pressure to be generated as the medium flows into, along, and through the first gap 30. Desirably, the pressure that is generated in the first gap 30 is high enough to drive the flow of the medium through the openings 44 in the planar portion 42 of the diffuser 40 in the second flow direction SD, into the second gap 34 (in embodiments that include the second gap) and through the first electrode 12. The openings 44 in the planar portion 42 are configured to create a pressure drop across the diffuser 40, i.e., the pressure on the first side 41 of the planar portion 42 is greater than the pressure on the second side 43 of the planar portion 42. The pressure drop not only drives the flow of the medium through the planar portion 42 and first electrode 12, but also helps minimize the chance of any small particles that may be in the medium from blocking the openings 44. An essentially uniform pressure drop over the area of the diffuser 40 provides an essentially uniform flow rate over the area of the first electrode 12.

As illustrated in FIG. 4, after the medium has passed through the first electrode 12 and into a gap 15 between the first electrode 12 and the second electrode 14, the medium flows in a third direction TD to the outlet channel 29 that is connected to the outlet 26 of the cell 10. The interface between the inlet channel 28 and the cavity 22, which may be referred to as an inlet 36 of the cavity 22, is located at the surface 32 of the electrode holder 20, but the interface between the cavity 22 and the outlet channel 29, which may be referred to as an outlet 38 of the cavity 22 is spaced from the surface 32 of the electrode holder 20 at a position that corresponds to the gap 15 between the first electrode 12 and the second electrode 14. In addition, as illustrated in FIG. 2, the location of the outlet 38 of the cavity is diagonally across the cavity 22 from the inlet 36 of the cavity, which maximizes the flow path of the medium within the cavity 22.

The location of the inlet 36 and outlet 38 of the cavity may improve the operation of the diffuser 40 to generate a substantially even distribution of the medium across the cross-section of the cell 10. A more even distribution of the medium to the first electrode 12 will allow a more even depletion of the fuel on the first electrode 12 as the fuel is oxidized when the cell 10 is in discharge mode, as discussed in further detail below. In contrast, an uneven distribution of the medium to the first electrode 12 may create uneven oxidation, which may cause depletion of the fuel at one portion of the first electrode 12 before depletion of the fuel at another portion of the first electrode 12. As the medium continues to flow to the first electrode 12, the medium will take a path of least resistance and flow through the portion of the first electrode 12 that no longer contains fuel. Over time, the level of power that is generated by the cell 10 will decrease, and the cell 10 will need to be recharged more frequently, even though the cell 10 still contains an adequate level of fuel. The diffuser 40 improves the efficiency of the cell 10 by providing a substantially even distribution of the medium across the surface of the first electrode 12 that faces the second side 43 of the planar portion 42 of the diffuser 40. A systematic flow nonuniformity may create uneven oxidation and earlier passivation (in the case of metal fuel) of the fuel in lower flow regions, which may lead to reduced capacity and redistribution of the active material.

Figure 5:
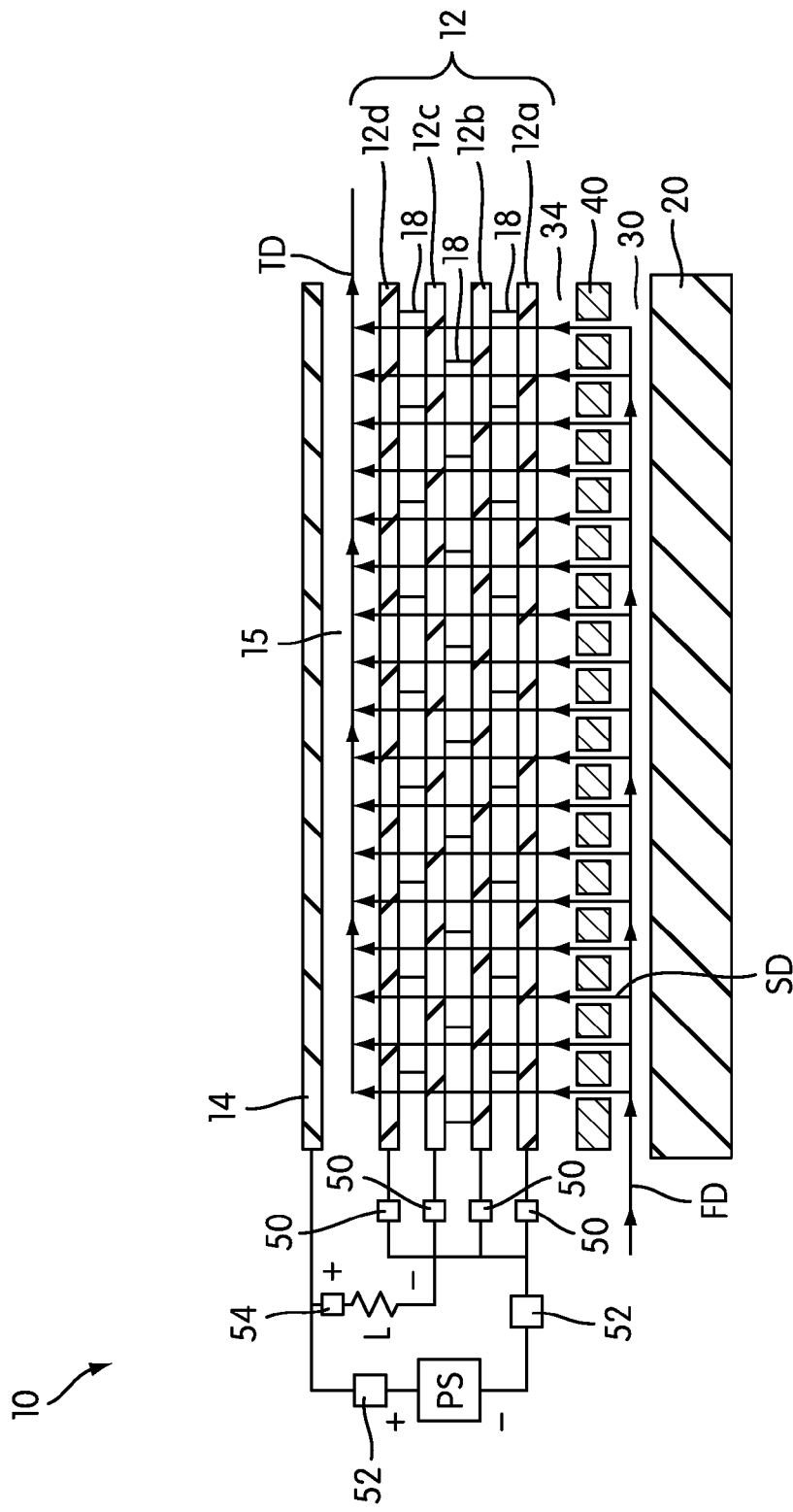
FIG. 5 is a schematic cross-sectional view of the cell of FIG. 1.

As illustrated in FIG. 5, the first electrode 12 is connected to an external load L so that electrons given off by the fuel as the fuel is oxidized at the first electrode 12 flow to the external load L. The external load L may be coupled to each of the permeable electrode bodies 12a-12d in parallel, as described in detail in U.S. patent application Ser. No. 12/385,489, filed on Apr. 9, 2009 and incorporated herein by reference. In an embodiment, the permeable electrode bodies 12a-12d may be formed from a conductive material or may be coated with a conductive material that acts as the fuel for the cell 10.

The second electrode 14 functions as a cathode when the second electrode 14 is connected to the external load L and the cell 10 operates in discharge mode. When functioning as a cathode, the second electrode 14 is configured to receive electrons from the external load L and reduce an oxidizer that contacts the second electrode 14. In an embodiment, the second electrode 14 comprises an air breathing electrode and the oxidizer comprises oxygen in the surrounding air.

The oxidizer may be delivered to the second electrode 14 by a passive transport system. For example, where oxygen present in ambient air is the oxidizer, simply exposing the second electrode 14 to ambient air (via openings in the cell, not shown) may be sufficient to allow diffusion/permeation of oxygen into the second electrode 14. Other suitable oxidizers may be used and embodiments described herein are not limited to the use of oxygen as the oxidizer.

In other embodiments, a pump, such as an air blower, may be used to deliver the oxidizer to the second electrode 14 under pressure. The oxidizer source may be a contained source of oxidizer. Likewise, when the oxidizer is oxygen from ambient air, the oxidizer source may be broadly regarded as the delivery mechanism, whether it be passive or active (e.g., pumps, blowers, etc.), by which the air is permitted to flow to the second electrode 14. Thus, the term "oxidizer source" is intended to encompass both contained oxidizers and/or arrangements for passively or actively delivering oxygen from ambient air to the second electrode 14.

Electricity that can be drawn by the external load L is generated when the oxidizer at the second electrode 14 is reduced, while the fuel at the first electrode 12 is oxidized to an oxidized form. The electrical potential of the cell 10 is depleted once the fuel at the first electrode 12 is entirely oxidized or oxidation is arrested due to passivation of the fuel electrode. A switch 54 may be positioned in between the second electrode 14 and the load L so that the second electrode 14 may be connected and disconnected from the load L, as desired.

After the fuel in the cell 10 has been entirely oxidized, or whenever it is desirable to regenerate the fuel within the cell 10 by reducing the oxidized fuel ions back to fuel, the first electrode 12 and the second electrode 14 may be decoupled from the external load L and coupled to a power supply PS with the use of suitable switches 52, as illustrated in FIG. 5. The power supply PS is configured to charge the cell 10 by applying a potential difference between the first electrode 12 and the second electrode 14 such that the reducible species of the fuel is reduced and electrodeposited onto the permeable electrode bodies 12a-12d and the corresponding oxidation reaction takes place at the second electrode 14, which is typically oxidation of an oxidizable species to evolve oxygen, which may be off-gassed from the cell 10. As described in detail in U.S. patent application Ser. No. 12/385,489, filed on Apr. 9, 2009 and incorporated herein by reference, only one of the permeable electrode bodies, such as 12a, may be connected to the power supply PS so that the fuel reduces onto the permeable electrode body and progressively grows to and on the other permeable electrode bodies 12b-12d, one by one. To ensure that the fuel is electrodeposited on each of the permeable electrode bodies 12a-12d, the power supply PS may be coupled to each permeable electrode body 12a-12d one by one with the use of current isolators 50. The current isolators 50 may communicate with the switches 52 that are configured to control the switching within the cell 10. For example, the switches 52 may control when the cell 10 operates in discharge mode and in charge mode. Moreover, the current isolators may control when each of the permeable electrode bodies 12a-12d is charged with fuel during charge mode.

The current isolators 50 may prevent current from flowing among the permeable electrode bodies 12a-12d, except as enabled by progressive growth of the fuel from one permeable electrode body to an adjacent permeable electrode body during charging. The current isolators 50 also isolate the permeable electrode bodies 12b-12d from direct connection with the power supply PS when the power supply PS is only connected to the permeable electrode body 12d that is closest to the second electrode 14, such that the only connection is that established by the progressive growth of the fuel between the permeable electrode bodies 12a-12d. Stated differently, the current isolators 50 prevent the potential of the power supply from being applied directly to those permeable electrode bodies 12a-12c via the circuit during charging. As such, the only way for the electrical current/potential to be applied to those permeable electrode bodies 12a-12c is via the electrodeposited growth within the stack as described in detail in U.S. patent application Ser. No. 12/385,489, filed on Apr. 9, 2009 and incorporated herein by reference.

The current isolators 50 may take any form, and no particular isolator should be regarded as limiting. For example, each current isolator 50 may be provided by one or more diodes that are oriented to allow electrons to flow from the permeable electrode bodies 12a-12d to the circuit portion comprising the load, but prevent any current flow in the opposite direction. Likewise, the current isolator 50 may be a switch that is closed during power generation/discharge to connect at least one of the permeable electrode bodies 12a-12d to the circuit portion comprising the load L, and that is open during charging to disconnect and isolate the permeable electrode bodies 12a-12d from that circuit.

Any suitable control mechanism may be provided to control the action of the switches 52 between the open and closed positions. For example, a relay switch that is biased toward the open position may be used, with an inductive coil coupled to the power supply that causes closure of the switch when charging begins. Further, a more complex switch that allows for individual connection to the permeable electrode bodies 12a-12d could be used to provide the connection/disconnection to and from the load, and to and from each other. Also, the current isolators may be different elements, such as a switch for current isolator 50 at the permeable body 12a, and rectifiers at the other permeable electrode bodies 12b-12d. Any other suitable electrical component that provides such isolation may be used.

Figure 6:
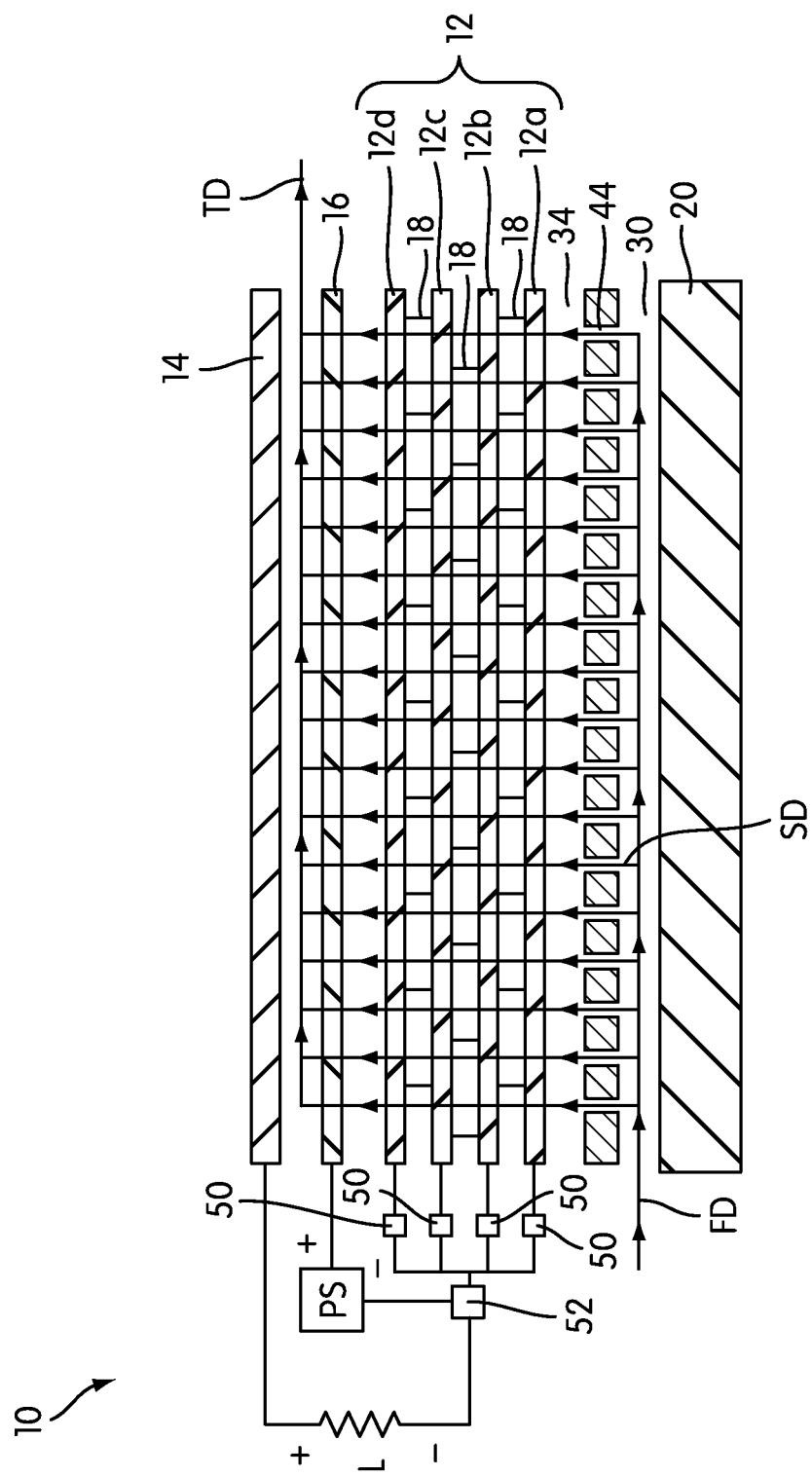
FIG. 6 is a schematic cross-sectional view of an embodiment of the cell.

FIG. 6 shows an embodiment where a third electrode 16 is provided to function as the charging electrode, rather than the second electrode 14. Thus, in the embodiment described above with respect to FIG. 5, the second electrode 14 functions as the cathode during power generation/discharge, and as the anode during charging, as described above. In FIG. 6, the load is coupled in parallel to each of the permeable electrode bodies 12a-12d of the first electrode 12, and also to the third electrode 16 during recharge. During current generation, the fuel on the first electrode 12 is oxidized, generating electrons that are conducted to power the load L and then conducted to the second electrode 14 for reduction of the oxidizer (as discussed in more detail above).

Similarly to the current isolators 50 in FIG. 5, the current isolators 50 in FIG. 6 prevent current from flowing directly between the other electrode bodies 12b-12d and the power supply via the circuit during charging, and also among the electrode bodies, except as enabled by the progressive growth of the fuel. Stated differently, the current isolators 50 prevent the potential of the power supply from being applied directly to those electrode bodies 12b-12d via the circuit during charging. Thus, the electrical current/potential is only applied to electrode bodes 12b-12d via the electrodeposition growth within the stack as described in U.S. patent application Ser. No. 12/385,489, filed on Apr. 9, 2009 and incorporated herein by reference. Preferably, each of the current isolators 50 in FIG. 6 is a switch that moves between open and closed positions, as a diode would not provide an isolation function in the illustrated design. Likewise, the switches 52 prevent current from flowing between the electrodes and the power supply during power generation, but allows current to flow from the power supply during charging; and the switch 54 prevents current from flowing between the second electrode 14 and the circuit portion comprising the load and the other electrode bodies 12a-12d during charging, but allows current to flow from the load to the second electrode 14 during power generation. The switches 52, 54 may, be omitted in some systems. As such, the only way for the electrical current/potential to be applied to those electrode bodies 12b-12d is via the electrodeposited growth within the stack as described above. The current isolators may take any form, including those mentioned above, and no particular isolator should be regarded as limiting.

It is also possible in any of the embodiments of the invention to apply the cathodic potential simultaneously to all the electrode bodies 12a-12d of the first electrode 12, rather than to just one to produce body-by-body progressive growth. Progressive growth emanating from one terminal is advantageous because it provides more density. Specifically, the growth in the previously connected electrode bodies continues as each subsequent body is connected by the progressing growth. Although the diffuser 40 may increase the density of the fuel during the body-to-body progressive growth by increasing the uniformity of the flow of the medium across the area of the permeable electrode bodies 12a-12d, progressive growth generally takes more time than applying the cathodic potential to multiple electrode bodies simultaneously. With all the electrode bodies subject to the same potential, the growth will only occur until a short occurs between the charging electrode, which is the second electrode 14 in the embodiment of FIG. 5 and third electrode 16 in the embodiment of FIG. 6, and the electrode body proximate to it. Thus, it is possible to have a faster, but less dense, growth in this manner, which may be amenable to certain re-charging needs.

The embodiments illustrated in FIGS. 5 and 6 should not be considered to be limiting in any way and are provided as non-limiting examples of how the cell 10 may be configured to be rechargeable. For example, U.S. Provisional Patent Application Ser. No. 61/243,970, filed on Sep. 18, 2009, and U.S. patent application Ser. No. 12/885,268, filed Sep. 17, 2010, the entire contents of both of which are incorporated herein by reference, describe embodiments of a rechargeable electrochemical cell system with charge/discharge mode switching in the cells.

In addition, any of the embodiments of the switches described above (e.g., to enable the charge mode, and discharge mode) may also be used with a plurality of electrochemical cells having a dynamically changing oxygen evolving (i.e., charging) electrode/fuel electrode, such as the progressive one described in U.S. Patent Application Ser. No. 61/383,510, filed Sep. 16, 2010 and incorporated in its entirety herein by reference. For example, as described in U.S. Provisional Patent Application Ser. No. 61/383,510, each cell 10 may also have its own plurality of switches associated with the electrode bodies to enable progressive fuel growth.

For example, in an embodiment, during charging, the charging electrode of each cell 10 may be coupled to the first electrode 12 of the subsequent cell 10. In an embodiment, during charging, a first electrode body 12a of the first electrode 12 may have a cathodic potential and the rest of the electrode bodies and/or a separate charging electrode may have an anodic potential. In such an embodiment, during the progressive fuel growth of the first electrode 12, the fuel may grow on the first electrode body 12a having the cathodic potential and cause a short with the adjacent electrode body 12b having the anodic potential. The adjacent electrode body 12b may then be disconnected from the source of anodic potential such that through electrical connection, the adjacent electrode body 12b also has the cathodic potential. This process may continue with the rest of the electrode bodies until no further growth is possible (i.e., the cathodic potential has shorted to the last electrode body having an anodic potential or a separate charging electrode). A plurality of switches may be provided to connect/disconnect the electrode bodies to one another and/or to sources of cathodic or anodic potential. Thus, in such embodiments having progressive fuel growth, the charging electrode may be a separate charging electrode from the first electrode 12 or may be at least the adjacent electrode body of the first electrode 12, up to all the other electrode bodies, having an anodic potential. In other words, the charging electrode may be a separate charging electrode, an electrode body having an anodic potential located adjacent to the at least one electrode body having a cathodic potential, and/or a group of electrode bodies having an anodic potential located adjacent to the at least one electrode body having a cathodic potential.

Thus, the charging electrode, as that term is used in the broader aspects of this application, need not necessarily be a static or dedicated electrode that only plays the anodic charging role (although it may be), and it may at times be a body or bodies within the fuel electrode to which an anodic potential is applied. Hence, the term dynamic is used to refer to the fact that the physical element(s) functioning as the charging electrode and receiving an anodic potential during charging may vary.

During discharging, the second electrode 14 of a cell 10 may be operatively connected to the first electrode 12 of the subsequent cell 10 and fuel consumption would be through the electrode bodies (wherein the electrical connection between the electrode bodies are through fuel growth). If a cell 10 is not functioning properly or for other reasons, the cell 10 may also be bypassed using the bypass switching features, as described in U.S. patent application Ser. No. 12/885,268, filed Sep. 17, 2010.

Also, in some embodiments, the cells may be designed as "bi-cells." That term refers to a pair of air electrodes that are on opposing sides of a fuel electrode. During discharge, the air electrodes are at generally the same cathodic potential and the fuel electrode is at an anodic potential. Typically, a pair of dedicated charging electrodes may be disposed in the ionically conductive medium between the air electrodes and the fuel electrode. During charging, the charging electrodes are at generally the same anodic potential, and the fuel electrode is at a cathodic potential (alternatively, the charging electrode may dynamically charge, as described above). Thus, the air electrodes may share a common terminal, and the fuel electrode has its own terminal, and the charging electrodes may also share a common terminal. As such, electrochemically speaking, such a bi-cell may be regarded as a single cell (although within the bi-cell, certain aspects of the cell, such as bi-directional fuel growth, may cause a bi-cell to be considered as two cells for certain purposes; however, at a higher level for mode discharging and connection management, those aspects are less relevant and the bi-cell can be viewed as a single cell). In an embodiment, the pair of air electrodes may correspond to the second electrode 14, the fuel electrode may correspond to the first electrode 12, and the pair of charging electrodes may correspond to the third electrode 16.

Returning to FIGS. 1 and 2, after the ionically conductive medium has passed through the first electrode 12, the medium may flow into the outlet channel 29 that is connected to the cavity 22 of the electrode holder 20 and the outlet 26. The outlet 26 may be connected to the inlet 24 in embodiments where the medium is recirculated in the cell 10, or to an inlet 24 of an adjacent cell, as discussed in further detail below, when a plurality of cells 10 are fluidly connected in series. In an embodiment, the outlet 26 may be connected to a vessel to collect the medium that has been used in the cell 10.

Figure 7:
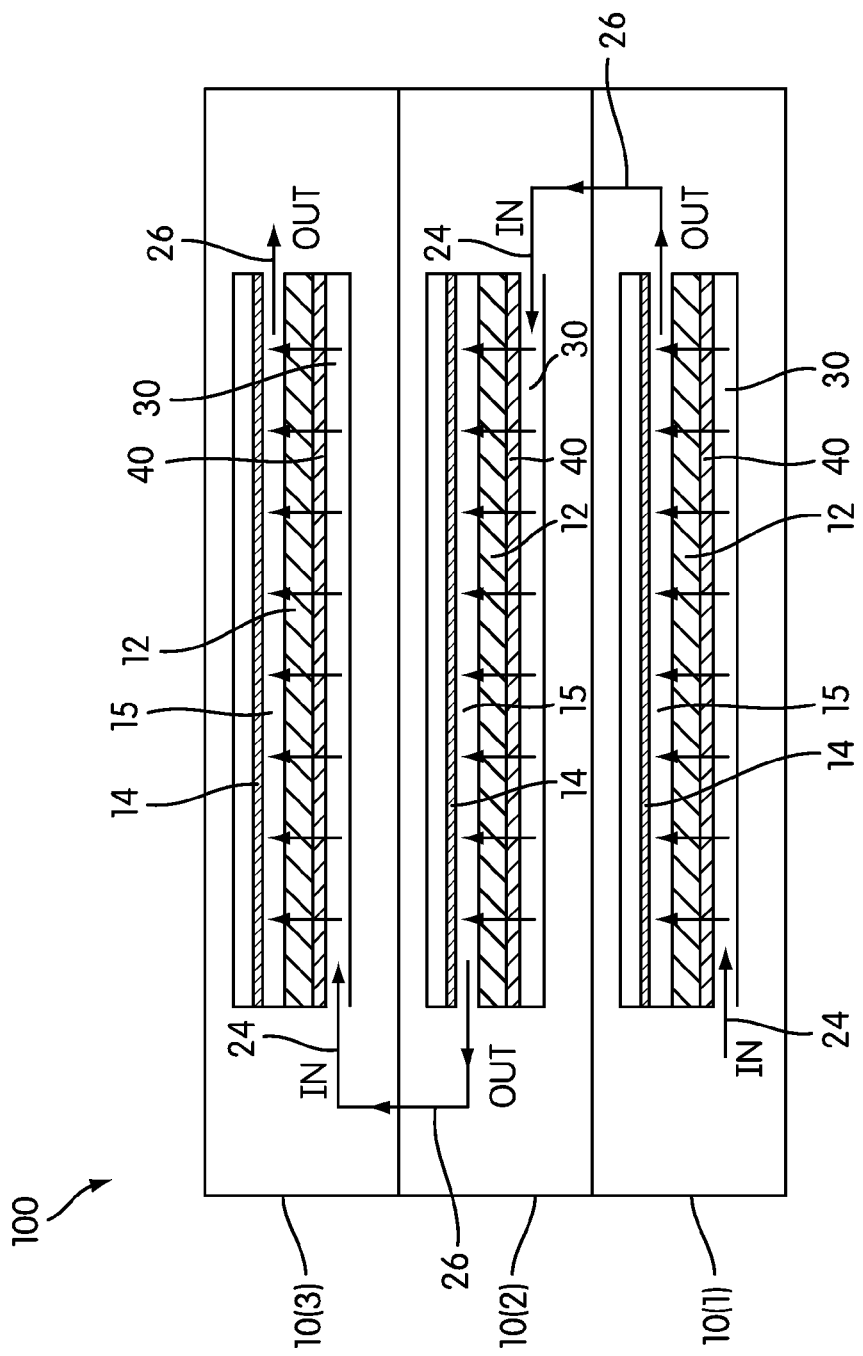
FIG. 7 is a schematic cross-sectional view of an embodiment of a stack of three cells of FIG. 1 fluidly connected in series.

FIG. 7 schematically illustrates an embodiment of a stack of cells 100 that includes three cells 10, as described above, that are fluidly connected in series. Details of embodiments of cells that are connected in series are provided in U.S. Provisional Patent Application No. 61/193,540, filed Dec. 5, 2008, and U.S. patent application Ser. No. 12/631,484, filed Dec. 4, 2009, the contents of both of which are incorporated herein by reference in their entireties. As illustrated in FIG. 7, the outlet 26 of a first cell 10(1) is connected to the inlet 24 of a second cell 10(2), and the outlet 26 of the second cell 10(2) is connected to the inlet 24 of a third cell 10(3). Due to the meandering, tortuous paths that are created by the inlet channel 28 and the outlet channel 29, described above and illustrated in FIG. 2, the length of the flow passageways for the medium via the channels 28, 29 is greater than the gap 15 between the first electrode 12 and the second electrode 14 in each of the cells 10(1), 10(2), 10(3). This creates an ionic resistance between the pair of fluidly connected cells that is greater than an ionic resistance within an individual cell 10. This may reduce or minimize internal ionic resistance loss of the stack of cells 100, as discussed in U.S. Provisional Patent Application No. 61/193,540, filed Dec. 5, 2008, and U.S. patent application Ser. No. 12/631,484, filed Dec. 4, 2009.

In operation, the first electrode 12, which already has metal fuel deposited thereon, is connected to the load L and the second electrode 14 is connected to the load L. The ionically conductive medium enters the inlet 24 under positive pressure, flows through the inlet channel 28 and into the first gap 30 between the diffuser 40 and the surface 32 of the electrode holder 20. The gap 30 is configured to increase the pressure in the ionically conductive medium so that the ionically conductive medium is forced through the openings 44 in the planar portion 42 of the diffuser 40 in an orthogonal manner. The pressure drop between the first gap 30 and the second gap 34, which is between the diffuser 40 and the first electrode 12, provides a more uniform flow of the ionically conductive medium across the cross-section of the cell 10 as compared to the flow of the medium in a cell without the diffuser 40.

The ionically conductive medium flows through the permeable electrode bodies 12a-12d of the first electrode 12 and into the gap 15 between the first electrode 12 and the second electrode 14, thereby allowing the fuel to oxidize and conduct electrons to the load L, while the oxidizer is reduced at the second electrode 14 via the electrons that are conducted to the second electrode 14 by the load L. After the ionically conductive medium has passed through the permeable electrode bodies 12a-12d and into the gap 15, the medium flows out of the cavity 22 via the outlet 38 of the cavity 22, through the outlet channel 29, and out the outlet 26 of the cell 10.

When the potential of the cell 10 has been depleted or when it is otherwise desirable to recharge the cell 10, the first electrode 12 is connected to the negative terminal of the power supply PS and the charging electrode, which is the second electrode 14 in the embodiment illustrated in FIG. 5 and the third electrode 16 in the embodiment illustrated in FIG. 6, is connected to the positive terminal of the power supply PS. In the charging or recharge mode, the first electrode 12 becomes the cathode and the charging electrode 14, 16 becomes the anode.

By providing electrons to the first electrode 12, fuel ions may reduce into fuel and redeposit onto the permeable electrode bodies 12a-12d while the ionically conductive medium circulates through the cell 10 in the same manner as described above with respect to the discharge mode. By having a more uniform flow of the ionically conductive medium and minimizing stagnant regions that tend to promote rough, dendritic growth on the electrode bodies 12a-12d, improved electrodeposition of the fuel on the electrode bodies may be realized. Specifically, during charge mode, the electrodeposited fuel on the electrode bodies 12a-12d may be more compact, may have improved adhesion to the electrode bodies 12a-12d, and may generally be more uniform across the cell 10 with the diffuser 40 in place, as compared to a cell without the diffuser 40. Such an improved electrodeposition of the fuel on the electrode bodies 12a-12d may delay interelectrode shorting and therefore lead to a higher density of fuel, capacity, and energy density, as well as an enhanced cycle-life for the cell 10.

In other words, the diffuser 40 may provide a substantially uniform flow across the cross-section of the cell 10 in both discharge and charge modes, which may significantly improve the performance of the cell 10 in terms of capacity, round-trip charge efficiency, cycle life, etc., for the reasons discussed above.

Embodiments of the present invention are not limited to the management of the reaction by-product that is generated during discharge mode, as described above, and reversibly reduced and electrodeposited as the fuel during recharge. Rather, embodiments of the present invention can be used where the reducible fuel species is different from the reaction by-product and is supplied separately. Embodiments of the present invention provide a uniform flow pattern of the ionically conductive medium across the first electrode, and an even distribution of the ionically conductive medium between the permeable electrode bodies that make up the first electrode, which may improve the efficiency of the electrochemical cells and systems described above.

Where electrodes are referred to herein, it should be understood that various structures in some embodiments may function as one or more electrodes in different ways depending on the operational mode of the device. For example, in some embodiments where the oxidant electrode is bi-functional as a charging electrode, the same electrode structure acts as an oxidant electrode during discharging and as a charging electrode during charging. Similarly, in the embodiment where the charging electrode is a dynamic charging electrode, all of the bodies of the fuel electrode act as the fuel electrode during discharging; but during charging one or more of the bodies act as the fuel electrode by receiving electrodeposited fuel and one or more other of the bodies act as the charging electrode to evolve the oxidant (e.g., oxygen), and the fuel electrode grows as the electrodeposited growth connects to more of the bodies. Thus, reference to an electrode is expressly defined as either a distinct electrode structure or the functional role a structure capable of multiple electrode functions may play during different operational modes of the cell (and thus the same multi-functional structure may be considered to satisfy multiple electrodes for this reason).

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed is:

1. An electrochemical cell comprising:
   a first electrode configured to operate as an anode to oxidize a fuel when connected to a load, the first electrode comprising a permeable electrode body configured to allow flow of an ionically conductive medium therethrough;
   an electrode holder comprising a cavity for holding the first electrode;
   a diffuser positioned in the cavity between the first electrode and the electrode holder with a gap between the diffuser and the electrode holder, the diffuser comprising a plurality of openings configured to allow flow of the ionically conductive medium therethrough and to distribute the flow through the first electrode; and
   a second electrode positioned in the cavity on a side of the first electrode that is opposite the diffuser, the second electrode being configured to operate as a cathode to reduce an oxidizer when connected to the load and in contact with the ionically conductive medium.

2. An electrochemical cell according to claim 1, wherein the plurality of openings are configured to generate a pressure drop across the diffuser when the ionically conductive medium is provided to the gap via the electrode holder, the pressure drop generating a substantially uniform flow over the area of the first electrode.

3. An electrochemical cell according to claim 1, wherein the diffuser comprises an inert material.

4. An electrochemical cell according to claim 1, wherein the first electrode comprises a series of permeable electrode bodies arranged in spaced apart relation, the permeable electrode bodies being configured to allow flow of the ionically conductive medium therethrough.

5. An electrochemical cell according to claim 4, further comprising a charging electrode spaced apart from the first electrode, the charging electrode being selected from the group consisting of (a) the second electrode, and (b) a third electrode, wherein the spaced apart relation of said permeable electrode bodies of the first electrode enables an electrical current to be applied between the charging electrode and at least one of the permeable electrode bodies with the charging electrode functioning as a temporary anode and the at least one permeable electrode body functioning as a temporary cathode, such that reducible fuel ions in the ionically conductive medium are reduced and electrodeposited as the fuel in oxidizable form on the at least one permeable electrode body.

6. An electrochemical cell according to claim 4, wherein the electrodeposition causes growth of the fuel among the permeable electrode bodies such that the electrodeposited fuel establishes an electrical connection between the permeable electrode bodies.

7. An electrochemical cell according to claim 1, further comprising a support configured to support the diffuser and define the gap.

8. An electrochemical cell according to claim 6, wherein the diffuser comprises the support.

9. An electrochemical cell according to claim 6, wherein the electrode holder comprises the support.

10. An electrochemical cell according to claim 1, wherein the gap is configured to provide an increase in pressure in a fluid medium as the fluid medium flows into the gap.

11. An electrochemical cell according to claim 1, wherein the electrode holder comprises an inlet configured to provide the ionically conductive medium to the gap, and an outlet configured to receive the ionically conductive medium from the cavity.

12. A method for generating electricity with an electrochemical cell, the electrochemical cell comprising
    a first electrode configured to operate as an anode to oxidize a fuel when connected to a load and in contact with an ionically conductive medium, the first electrode comprising a permeable electrode body,
    an electrode holder comprising a cavity for holding the first electrode,
    a diffuser positioned in the cavity between the first electrode and the electrode holder with a gap between the diffuser and the electrode holder, and
    a second electrode positioned in the cavity on a side of the first electrode that is opposite the diffuser, the second electrode being configured to operate as a cathode to reduce an oxidizer when connected to the load and in contact with the ionically conductive medium, the method comprising:
    flowing the ionically conductive medium to the gap between the diffuser and the electrode holder;
    distributing a flow of the ionically conductive medium with the diffuser across a cross-section of the electrochemical cell so that the ionically conductive medium flows through the first electrode substantially uniformly;
    oxidizing the fuel at the first electrode; and
    reducing the oxidizer at the second electrode.

13. A method according to claim 12, further comprising increasing the pressure of the ionically conductive medium as the ionically conductive medium flows into the gap.

14. A method according to claim 12, further comprising generating a pressure drop across the diffuser.

15. A method for charging an electrochemical cell, the electrochemical cell comprising
    a first electrode configured to operate as an anode to oxidize a fuel when connected to a load and in contact with an ionically conductive medium, the first electrode comprising a permeable electrode body,
    an electrode holder comprising a cavity for holding the first electrode,
    a diffuser positioned in the cavity between the first electrode and the electrode holder with a gap between the diffuser and the electrode holder, and
    a second electrode positioned in the cavity on a side of the first electrode that is opposite the diffuser, the second electrode being configured to operate as a cathode to reduce an oxidizer when connected to the load and in contact with the ionically conductive medium, the method comprising:

flowing the ionically conductive medium comprising reducible fuel ions to the gap between the diffuser and the electrode holder;
distributing a flow of the ionically conductive medium with the diffuser across a cross-section of the electrochemical cell so that the ionically conductive medium flows through the first electrode substantially uniformly;
applying an electrical current between the second electrode and the permeable, electrode body with the second electrode functioning as an anode and the permeable electrode body functioning as a cathode, such that the reducible fuel ions are reduced and electrodeposited as fuel in oxidizable form on the permeable electrode body; and
removing the electrical current to discontinue the charging.

16. A method according to claim 15, further comprising increasing the pressure of the ionically conductive medium as the ionically conductive medium flows into the gap.

17. A method according to claim 15, further comprising generating a pressure drop across the diffuser.

18. A method according to claim 15, wherein the first electrode comprises a series of permeable electrode bodies arranged in spaced apart relation, the permeable electrode bodies being configured to allow flow of the ionically conductive medium therethrough, and wherein said electrodeposition causes growth of the fuel among the permeable electrode bodies such that the electrodeposited fuel establishes an electrical connection between the permeable electrode bodies.

19. A method for operating an electrochemical cell, the electrochemical cell comprising:
a first electrode configured to operate as an anode to oxidize a fuel when connected to a load and in contact with an ionically conductive medium, the first electrode comprising a permeable electrode body,
an electrode holder comprising a cavity for holding the first electrode,
a diffuser positioned in the cavity between the first electrode and the electrode holder with a gap between the diffuser and the electrode holder, and
a second electrode positioned in the cavity on a side of the first electrode that is opposite the diffuser, the second electrode being configured to operate as a cathode to reduce an oxidizer when connected to the load and in contact with the ionically conductive medium, the method comprising:
generating electricity to power a load, said generating electricity comprising
flowing the ionically conductive medium to the gap between the diffuser and the electrode holder,
distributing a flow of the ionically conductive medium with the diffuser across a cross-section of the electrochemical cell so that the ionically conductive medium flows through the first electrode substantially uniformly,
oxidizing the fuel at the first electrode, and
reducing the oxidizer at the second electrode; and
charging the electrochemical cell, said charging comprising
flowing the ionically conductive medium comprising reducible fuel ions to the gap between the diffuser and the electrode holder,
distributing a flow of the ionically conductive medium with the diffuser across a cross-section of the electrochemical cell so that the ionically conductive medium flows through the first electrode substantially uniformly,
applying an electrical current between the second electrode and the permeable electrode body with the second electrode functioning as an anode and the permeable electrode body functioning as a cathode, such that the reducible fuel ions are reduced and electrodeposited as fuel in oxidizable form on the permeable electrode body, and
removing the electrical current to discontinue the charging.

20. A method according to claim 19, wherein the first electrode comprises a series of permeable electrode bodies arranged in spaced apart relation, the permeable electrode bodies being configured to allow flow of the ionically conductive medium therethrough, and wherein said electrodeposition causes growth of the fuel among the permeable electrode bodies such that the electrodeposited fuel establishes an electrical connection between the permeable electrode bodies.

21. A method according to claim 19, further comprising increasing the pressure of the ionically conductive medium as the ionically conductive medium flows into the gap.

22. A method according to claim 19, further comprising generating a pressure drop across the diffuser.

* * * * *